US006959419B2

(12) United States Patent
Taniwaki

(10) Patent No.: US 6,959,419 B2
(45) Date of Patent: Oct. 25, 2005

(54) AUDIENCE INFORMATION COLLECTING SYSTEM, AUDIENCE INFORMATION COLLECTING METHOD, AND INFORMATION PROVIDING METHOD

(75) Inventor: Yoshinori Taniwaki, Tokyo (JP)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 09/879,354

(22) Filed: Jun. 12, 2001

(65) Prior Publication Data

US 2002/0054078 A1    May 9, 2002

(30) Foreign Application Priority Data

Jun. 13, 2000    (JP)    .............................. 2000-177323

(51) Int. Cl.[7] .......................... G06F 3/00; H04N 5/445
(52) U.S. Cl. ...................... 715/716; 715/733; 715/864; 715/866; 725/37
(58) Field of Search ................................ 345/730, 733, 345/744, 745, 747, 700, 716, 717, 753, 761, 345/751, 962, 472, 434, 463; 705/12, 14, 705/16, 26, 27; 52/8, 9, 6; 715/716–719, 715/730, 733, 748, 751, 753, 756, 864, 866; 725/1–6, 725/8–11, 13, 24, 37, 60, 61, 74–83, 85–87, 725/100, 151–153

(56) References Cited

U.S. PATENT DOCUMENTS

| | | | | |
|---|---|---|---|---|
| 4,377,870 A | * | 3/1983 | Anderson et al. .............. | 725/24 |
| 4,866,515 A | * | 9/1989 | Tagawa et al. ................ | 725/77 |
| 5,000,511 A | * | 3/1991 | Shichijo et al. ........ | 297/188.05 |
| 5,034,807 A | * | 7/1991 | Von Kohorn ................... | 725/5 |
| 5,226,177 A | * | 7/1993 | Nickerson ..................... | 725/24 |
| 5,273,437 A | * | 12/1993 | Caldwell et al. ............ | 434/351 |
| 5,465,384 A | * | 11/1995 | Bejan et al. ............... | 455/2.01 |
| 5,759,101 A | * | 6/1998 | Von Kohorn ................ | 463/40 |
| 5,770,849 A | * | 6/1998 | Novis et al. ................ | 235/492 |
| 5,801,754 A | * | 9/1998 | Ruybal et al. ................ | 725/65 |
| 5,835,715 A | * | 11/1998 | Dahl ......................... | 709/209 |
| 5,884,282 A | * | 3/1999 | Robinson ..................... | 705/27 |
| 5,949,411 A | * | 9/1999 | Doerr et al. ................ | 345/716 |
| 6,011,578 A | * | 1/2000 | Shatto et al. ................. | 725/14 |
| 6,034,688 A | * | 3/2000 | Greenwood et al. ........ | 715/784 |
| 6,056,640 A | * | 5/2000 | Schaaij .......................... | 463/4 |
| 6,065,042 A | * | 5/2000 | Reimer et al. ............. | 709/203 |
| 6,257,982 B1 | * | 7/2001 | Rider et al. ................... | 463/31 |
| 6,293,868 B1 | * | 9/2001 | Bernard ....................... | 463/42 |
| 6,298,218 B1 | * | 10/2001 | Lowe et al. ............... | 455/66.1 |
| 6,346,045 B2 | * | 2/2002 | Rider et al. ................... | 463/31 |
| 6,356,939 B1 | * | 3/2002 | Dahl ......................... | 709/209 |
| 6,368,216 B1 | * | 4/2002 | Hedrick et al. ................ | 463/20 |
| 6,409,599 B1 | * | 6/2002 | Sprout et al. ................. | 463/31 |
| 6,443,840 B2 | * | 9/2002 | Von Kohorn ................ | 463/17 |
| 6,477,508 B1 | * | 11/2002 | Lazar et al. .................. | 705/26 |
| 6,587,837 B1 | * | 7/2003 | Spagna et al. ................ | 705/26 |
| 6,654,757 B1 | * | 11/2003 | Stern ......................... | 707/101 |
| 6,681,393 B1 | * | 1/2004 | Bauminger et al. ........... | 725/23 |
| 6,712,701 B1 | * | 3/2004 | Boylan et al. ................ | 463/42 |
| 6,722,980 B2 | * | 4/2004 | Stronach ..................... | 463/25 |

(Continued)

Primary Examiner—John Cabeca
Assistant Examiner—Brian J. Detwiler
(74) Attorney, Agent, or Firm—Frommer Lawrence & Haug LLP; William S. Frommer

(57) ABSTRACT

An information collecting system and method for providing information to members of the audience at theaters where movies and theatrical productions are presented, collecting information from the members of the audience, and compiling the information from the members of the audience.

13 Claims, 5 Drawing Sheets

U.S. PATENT DOCUMENTS 6,729,959 B1 * 5/2004 Moore et al. ................. 463/30
6,813,777 B1 * 11/2004 Weinberger et al. .......... 725/76
2002/0056118 A1 * 5/2002 Hunter et al. ................. 725/87

* cited by examiner

AUDIENCE INFORMATION COLLECTING SYSTEM, AUDIENCE INFORMATION COLLECTING METHOD, AND INFORMATION PROVIDING METHOD

BACKGROUND OF THE INVENTION

1. Field of the Invention

The present invention relates to information collecting systems and information collecting methods for providing information to members of the audience at theaters where movies and theatrical productions are presented, collecting information from the members of the audience, and compiling the information from the members of the audience.

2. Description of the Related Art

Theaters are very convenient venues for distributing agencies, production companies, and merchandise distributors, which present entertainment programs and sell related merchandise, to collect information from members of the audience as large groups of people typically gather at theaters to view movies, theatrical productions, and musical concerts. Hitherto, questionnaires have mainly been used to collect information such as feedback on the programs, and requests. At theaters, organizers of productions may provide members of the audience with information about other programs and related merchandise. For example, pamphlets, brochures, fliers are distributed, and posters and bills are posted. At movie theaters, commercials are screened prior to the presentation of feature films.

Collecting information using questionnaires takes time and labor, such as distribution and collecting of questionnaire forms and preparation of pens and pencils. For members of the audience, it is burdensome to fill out and submit questionnaire forms. As a result, the recovery rate is generally low. Also, the information which can be collected using this method is limited. Even when information is provided by distributing pamphlets, brochures, and fliers, by posting bills, and by screening commercials, it is impossible to satisfactorily provide more detailed, relevant information to members of the audience who become interested in a certain event or product because of the information provided in the theaters. It can be concluded that the conventional methods of providing information have been unsatisfactory. In theaters, merchandise such as pamphlets and posters are sold at concession stands. Carrying purchased merchandise home becomes an inconvenience.

SUMMARY OF THE INVENTION

Accordingly, it is an object of the present invention to provide an information collecting system for efficiently providing an audience member with more information and collecting information from the members of the audience.

Another object of the present invention is to provide an information collecting method for efficiently providing an audience member with more information and collecting information from the members of the audience.

In order to solve the foregoing problems, according to an aspect of the present invention, an audience information collecting system for providing information to an audience member at a venue where a performance including a movie or a theatrical production is presented and for collecting information from the audience member is provided. The audience information collecting system includes an audience terminal and an information collecting unit. The audience terminal includes a provided information output unit for outputting provided information to the audience member; a response information input unit for inputting predetermined response information given by the audience member in response to the provided information; a personal information reading unit for reading personal information from a storage medium having stored therein beforehand the personal information of the audience member; and a first transmitting/receiving unit for receiving the provided information and for transmitting the response information and the personal information. The information collecting unit includes a provided information storage unit for storing the provided information; a second transmitting/receiving unit for transmitting the provided information and for receiving the response information and the personal information; and a compiling unit for creating a compiled result of the response information and the personal information.

According to the audience information collecting system, it is possible to provide an audience member with more information by installing an audience terminal. Also, a response information input unit and a personal information reading unit enable the audience member to easily input information. The input information is automatically received and compiled by an information collecting unit. Information providers can thus efficiently collect response information given by the audience member in response to the provided information and personal information of the audience member.

According to another aspect of the present invention, there is provided an audience information collecting method for providing information to an audience member at a venue where a performance including a movie or a theatrical production is presented and for collecting information from the audience member. The audience information collecting method includes the steps of transmitting provided information to the audience member from an information collecting unit installed in the venue; reading personal information from a storage medium having stored therein beforehand the personal information of the audience member, wherein the reading is done using an audience terminal which is installed at each seat in the venue and which is connected to the information collecting unit via a network; receiving and outputting the provided information, wherein the receiving and outputting is done by the audience terminal; inputting predetermined response information given by the audience member in response to the provided information, wherein the inputting is done by the audience terminal; transmitting the response information and the personal information, wherein the transmitting is done by the audience terminal; and receiving and compiling the response information and the personal information, wherein the receiving and compiling is performed by the information collecting unit.

According to the audience information collecting method, it is possible to provide an audience member with more information by installing an audience terminal. Also, a response information input unit and a personal information reading unit enable the audience member to easily input information. The input information is automatically received and compiled by an information collecting unit. Information providers can thus efficiently collect response information given by the audience member in response to the provided information and personal information of the audience member.

DESCRIPTION OF THE PREFERRED EMBODIMENT

The present invention will become apparent from the following description of the preferred embodiment with reference to the accompanying drawings.

Figure 1:
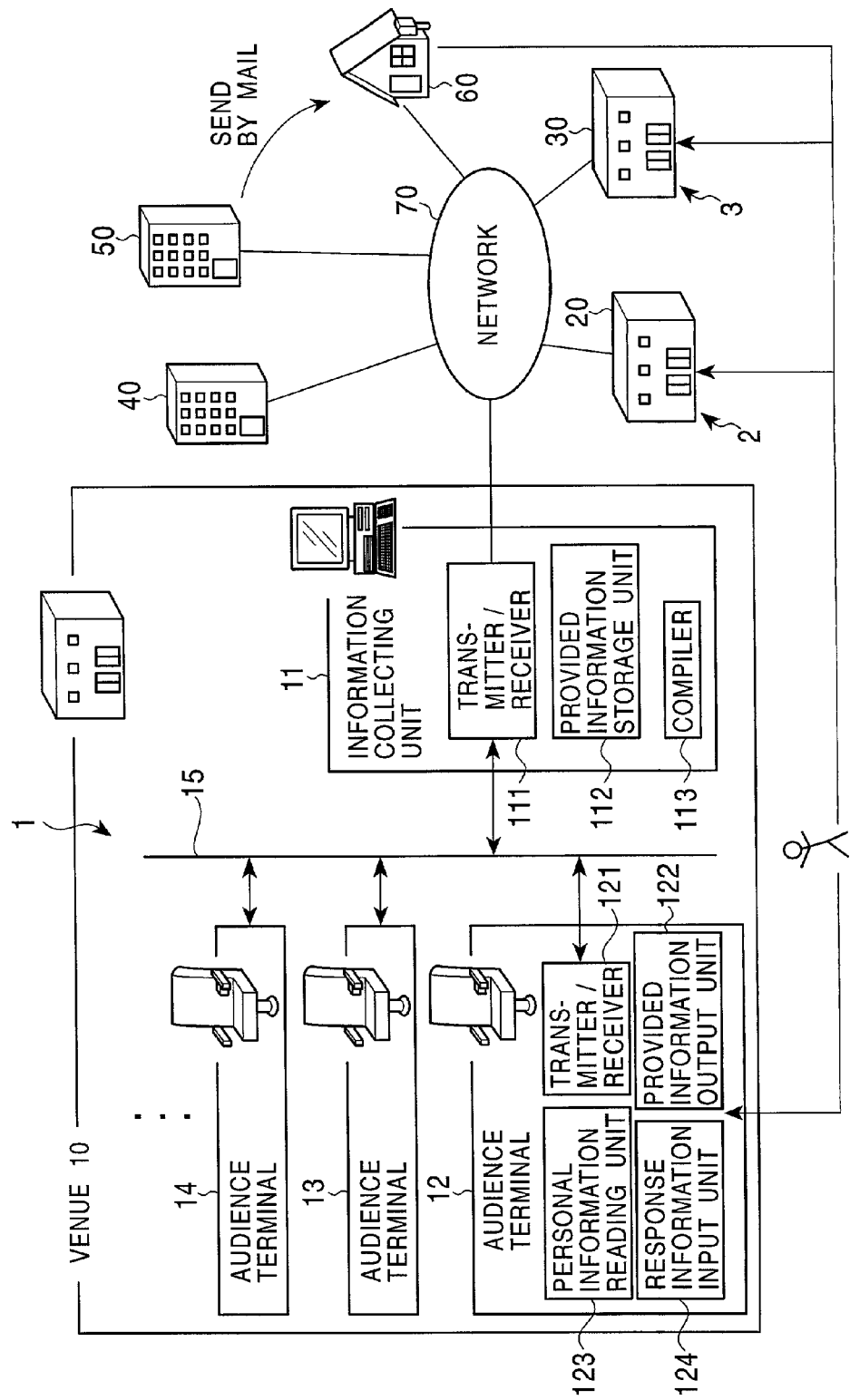
FIG. 1 illustrates the configuration of an audience information collecting system according to an embodiment of the present invention.

FIG. 1 shows the outline of an audience information collecting system according to an embodiment of the present invention.

An audience information collecting system 1 provides information to and collects information from members of the audience at a venue 10 such as a movie theater, a theater, a concert hall, or the like. The audience information system 1 includes an information collecting unit 11 for providing information and compiling collected information and audience terminals 12, 13, and 14 for outputting information to members of the audience and receiving information input by the members of the audience. The information collecting unit 11 and the audience terminals 12 to 14 are connected to one another by a network 15 such as a local area network (LAN) installed in the venue 10. The network 15 is capable of transmitting information at a high speed. The information collecting unit 11 includes a transmitter/receiver 111 for establishing a connection with the network 15 and transmitting and receiving information; a provided information storage unit 112 for storing information to be provided to an audience member; and a compiler 113 for compiling response information given by the audience member in response to the provided information. The audience terminal 12 includes a transmitter/receiver 121 for establishing a connection with the network 15 and transmitting and receiving information; a provided information output unit 122 for outputting provided information to an audience member; a personal information reading unit 123 for reading information from a recording medium having stored therein personal information of the audience member; and a response information input unit 124 for inputting response information given by the audience member in response to the provided information. The audience terminals 13 and 14 each have the same structure as that of the audience terminal 12. The audience terminals 12 to 14 are provided at each seat in the venue 10. The number of audience terminals corresponds to the number of seats and is not limited to three.

Audience information collecting systems 2 and 3, each having the same structure as that of the audience information collecting system 1, are provided in venues 20 and 30 all over the country. The audience information collecting systems 1 to 3 are connected, by a network 70 such as a public telephone circuit or the Internet, to computers installed at an information provider/collector 40, a distributor 50, and an audience member's home 60. The information provider/collector 40 provides members of the audience at the venues 10 to 30 with information and collects response information such as feedback and requests from members of the audience. Specifically, for example, the information provider/collector 40 is a film distributor, a concert producer, or a company requested by the film distributor or the concert producer to provide and collect information. The distributor 50 is a company which sells merchandise related to a performance using the audience information collecting systems 1 to 3 at the venues 10 to 30. The number of venues is not limited to three, and there may be a plurality of venues. The information provider/collector 40 and the distributor 50 are described by way of examples. For example, there may be a plurality of information providers/collectors and a plurality of distributors. Also, there may be an independent information provider and an independent information collector.

In the information collecting unit 11, information to be provided such as advertisements of performances and information on merchandise and selling of related merchandise is stored beforehand in the provided information storage unit 112. Alternatively, the provided information can be received by the transmitter/receiver 111 through the network 70 and can be stored in the provided information storage unit 112. From among the stored provided information, necessary information is transmitted through the network 15 in the venue 10 to the audience terminals 12 to 14 situated in seats at predetermined time.

For example, the audience terminal 12 is provided at an arm rest of each seat in the venue 10. The personal information reading unit 123 is an IC-card reader or an IC card reader/writer. By inserting a storage medium such as an IC card of an audience member into the personal information reading unit 123, stored personal information is read into the audience terminal 12. Subsequently, various pieces of information transmitted from the information collecting unit 11 are received by the transmitter/receiver 121, and the information is output by the provided information output unit 122 by displaying it on a screen or the like.

Concerning the output information, information on merchandise related to a performance is introduced prior to the start of the performance. During the performance, information such as the name of actors, or a diagram showing the relationships among characters is displayed in order to assist the audience member in understanding the performance. After the performance, a questionnaire form is displayed. If necessary, the audience member can input response information using the response information input unit 124. The response information is transmitted to the information collecting unit 11. For example, when a response to the questionnaire is input, the response information and information such as the age and occupation of the audience member read by the personal information reading unit 123 are transmitted to the information collecting unit 11. If the audience member inputs "yes" in response to a question on the screen asking whether or not the audience member would like more information regarding the introduced merchandise or the like, inquiry information and personal information such as name, address, and telephone number read from the storage medium are transmitted to the information collecting unit 11. The storage medium having stored therein the personal information may have an electronic money function of electronically storing currency value. If the audience member indicates, by inputting information to that effect, that the audience member would like to purchase displayed merchandise, a payment can be made at the same time. Also, the audience member can place an order for merchandise.

The response information input and transmitted by the audience terminals 12 to 14 are received by the information collecting unit 11 and are compiled by the compiler 113. For example, responses to a questionnaire, the age and occupation of a respondent, inquiries for more information, and a list of orders for merchandise are compiled. The compiled results are utilized by the venue 10 which manages the information collecting unit 11. The compiled results may be transmitted to the information provider/collector 40 and the distributor 50. The information provider/collector 40 and the distributor 50 compile necessary information from among the information compiled at the venues 10 to 30 over the country and use the questionnaire results for building business strategy. Also, the information provider/collector 40 and the distributor 50 deliver merchandise to the audience's home by mail. Concerning inquiries for more information, the requested information can be sent by e-mail.

For the producer of a performance, it is possible to provide more information to each audience member using the audience terminals 12 to 14 installed at their seats. Since it is possible for each audience member to easily input information using the response information input unit 124 and the personal information reading unit 123, it is possible to efficiently gather audience members' responses to provided information automatically. Also, members of the audience can obtain plenty of beneficial information such as information about related merchandise, and information that assists members of the audience in understanding the content of a performance. At the same time, the members of the audience can easily request more detailed information. With an electronic money function, it is possible to place an order for related merchandise and make a payment. Thus, the audience members would no longer be required to queue for merchandise and to carry around purchased merchandise until they get home. It would become unnecessary for the merchandise distributor 50 to hire salesclerks at the venues 10 to 30 to sell merchandise. As a result, the sales productivity is increased.

Figure 2:
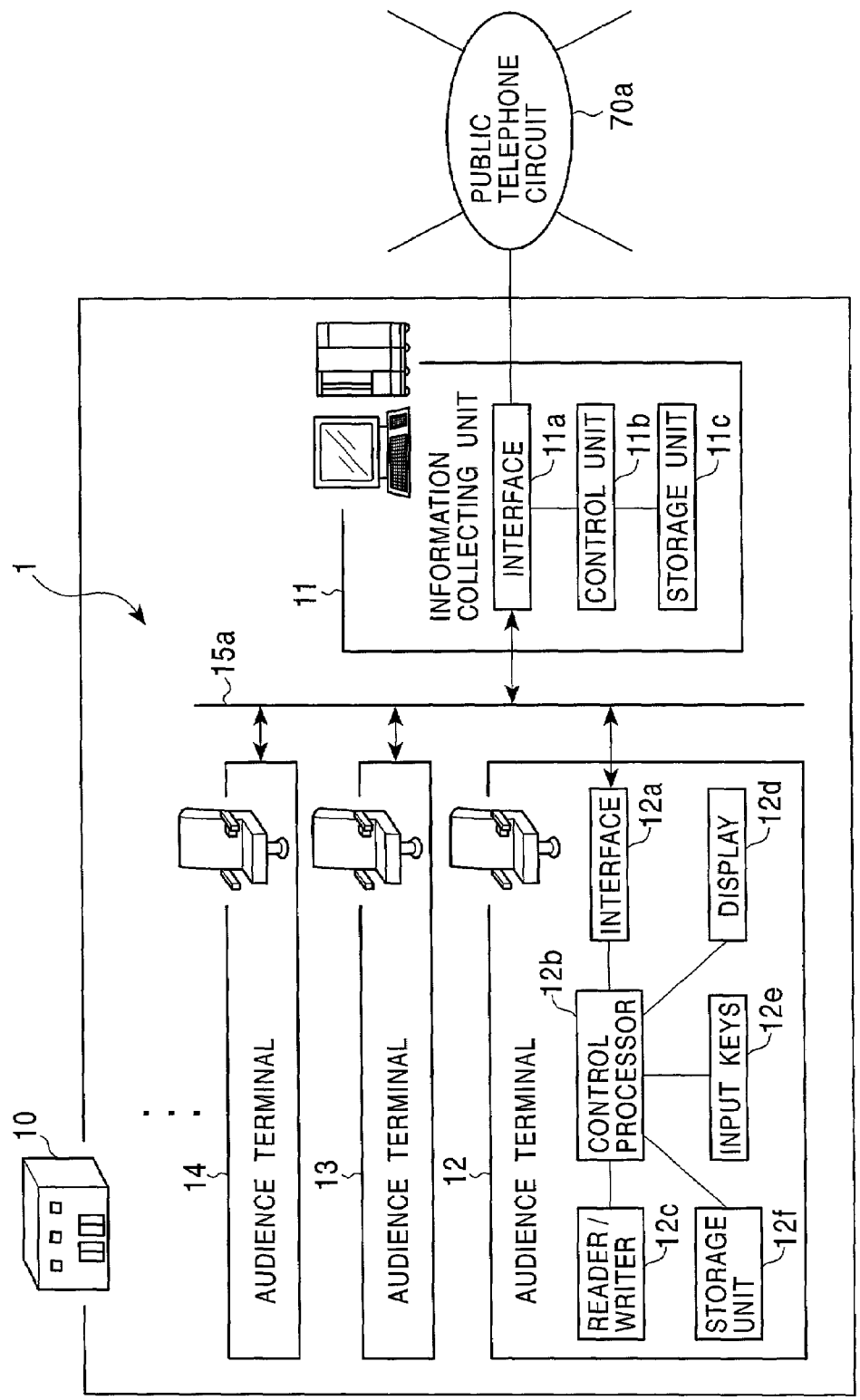
FIG. 2 illustrates an example of the device configuration of the audience information collecting system.

FIG. 2 shows an example of the device configuration of the audience information collecting system 1. In the following description, it is assumed that the venue 10 is a movie theater.

The information collecting unit 11 is a computer server apparatus including an interface 11a, which includes a modem (modulator-demodulator) or a LAN adapter, for establishing a network connection; a control unit 11b, which includes a processor, a read only memory (ROM), a random access memory (RAM), and the like, for performing various control processes; and a storage unit 11c, which includes a hard disk or the like, for storing provided information and various processing programs. Each process performed by the information collecting unit 11 is performed by executing a processing program stored in the storage unit 11c or the like.

The audience terminal 12 includes an interface 12a, which includes a LAN adapter or the like, for establishing a network connection; a control processor 12b, which includes a processor, ROM, RAM, and the like, for performing various control processes; a reader/writer 12c for reading and writing an IC card which is inserted therein; a display 12d for displaying provided information; input keys 12e which audience members use for inputting information; and a storage unit 12f, which includes a semiconductor RAM or the like, for temporarily storing provided information. In addition to these units, it is possible to provide an earphone terminal through which provided information is output, and earphones. The audience terminals 13 and 14 each have the same structure as that of the audience terminal 12. The audience terminals 12 to 14 are installed at the corresponding seats in the venue 10 and are connected to the information collecting unit 11 by the LAN 15a.

Figure 3A:
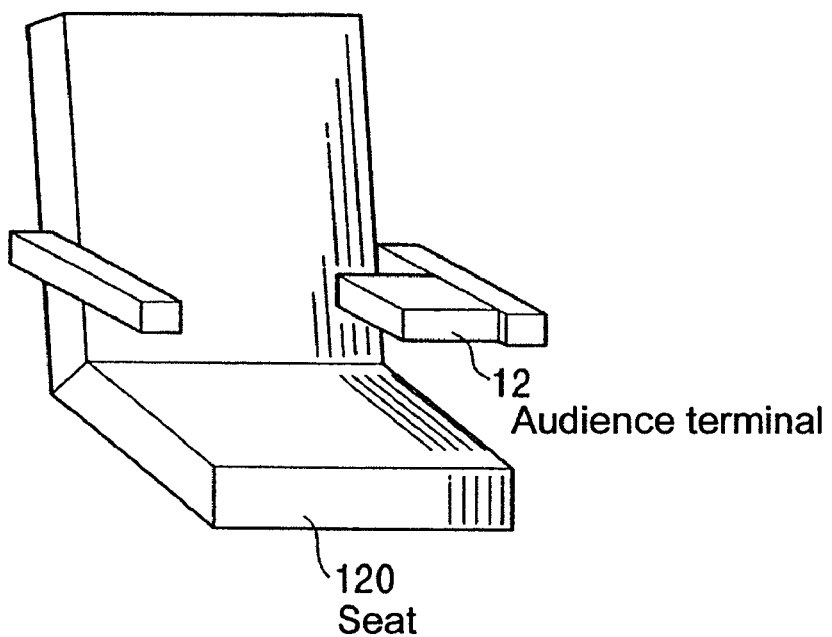
FIG. 3, which consists of FIGS. 3A and 3B, illustrate examples of an audience terminal, FIG. 3A illustrating an example in which the audience terminal is installed at a seat and FIG. 3B illustrating an external plan view.
Figure 3B:
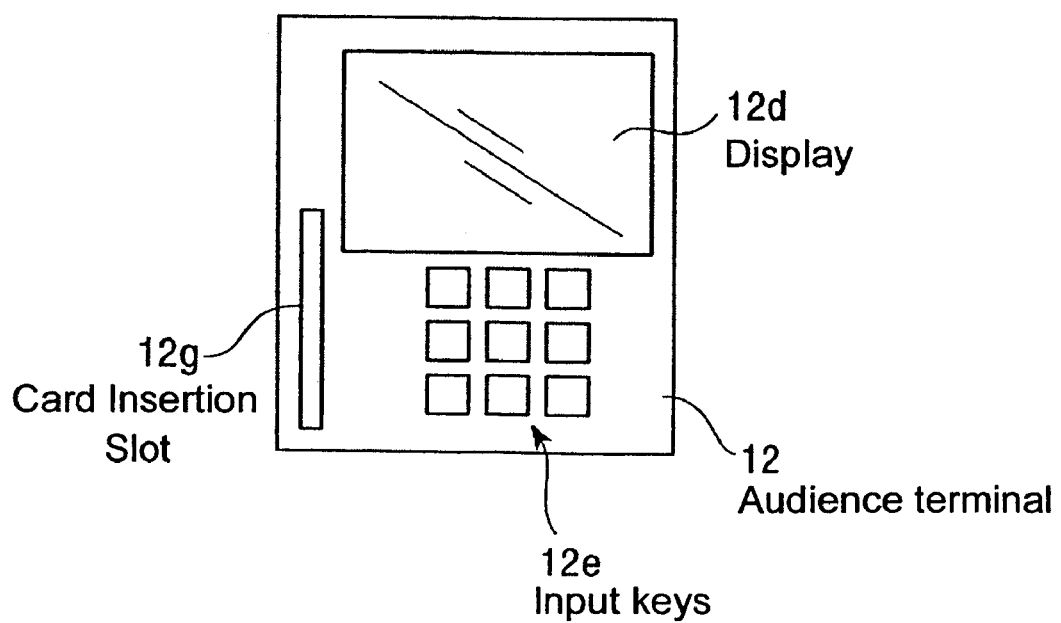

FIGS. 3A and 3B show an example of the audience terminal 12. FIG. 3A shows an example of the audience terminal 12 being installed at a seat, and FIG. 3B shows an external plan view of the audience terminal 12.

In the venue 10, as shown in FIG. 3A, the audience terminal 12 is installed at a position such as an arm rest or a back rest of a seat 120 so that an audience member who sits in the seat 120 can see a display easily and can operate the audience terminal 12 easily. As shown in FIG. 3B, on the upper surface of the audience terminal 12, a card insertion slot 12g of the reader/writer 12c into which an IC card having stored therein personal information is inserted; the small size display 12d, such as a liquid crystal display, for displaying provided information; and the input keys 12e for inputting information are provided. Instead of the input keys 12e, a touch panel display, wherein information can be input by pressing the screen, can be used as the display 12d. In this way, the display 12d also serves as an input unit.

An IC card is created beforehand at a reception desk of the venue 10 or at a predetermined store. When creating an IC card, personal information such as name, address, age, and e-mail address are stored in an IC memory in the IC card. In a registration process, a unique number of the IC card and a password for identifying the owner of the IC card are registered and are stored in the storage unit 11c of the information collecting unit 11 or in a server operated by a film distributor. Each audience member has his/her own IC card. The same IC card can be used at movie theaters all over the country. Once an IC card is created, the audience member is required to bring the IC card every time they go to movie theaters. When the audience member sits in a seat, the audience member inserts the IC card into the card insertion slot 12g, and the audience terminal 12 reads personal information. The audience member is then provided with information via the display 12d. Alternatively, when inputting response information to provided information using the input keys 12e, the audience member inserts the IC card. Also, the IC card has an electronic money function wherein funds can be electrically transferred from a bank account. With the electronic money function, when the audience member wants to purchase merchandise displayed on the display 12d, it is possible not only to place an order but also to make a payment using the audience terminal 12.

Figure 4:
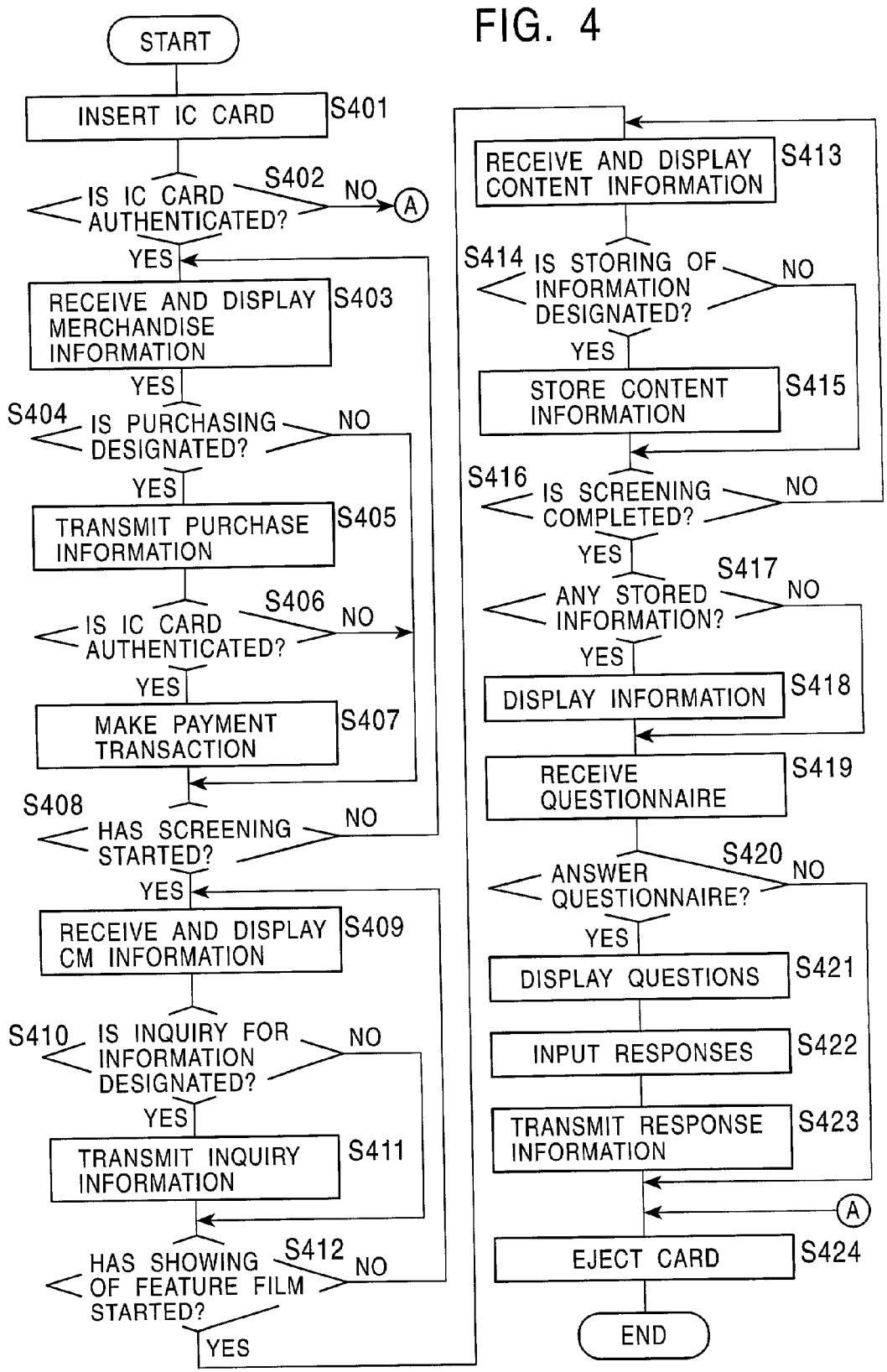
FIG. 4 is a flowchart showing a process performed by the audience terminal in a movie theater.

FIG. 4 is a flowchart showing a process performed by the audience terminal 12 at a movie theater.

When an audience member sits in a predetermined seat, an IC card is inserted into the card insertion slot 12g of the audience terminal 12 (S401). The control unit 12b performs processing to display a password input screen on the display 12d. The password is used to authenticate the IC card and the owner of the IC card which will be used when the audience member answers a questionnaire and when personal information is read and transmitted from the IC card. The audience member inputs a password using the input keys 12e, and the input password is sent to the information collecting unit 11. The input password is checked against the legitimate password that was registered when the IC card was created. Alternatively, the input password can be sent from the information collecting unit 11 to a server operated by a motion picture company through a public telephone circuit 70a, so that the server can perform authentication. If the input password does not match the registered password based on the authentication result (S402), it is determined that the carrier of the IC card is not the legitimate owner of the IC card. Thus, the IC card is disabled and is ejected from the card insertion slot 12g (S424).

If the input password matches the registered password, and the IC card is thus authenticated (S402), the audience terminal 12 starts receiving provided information transmitted from the information collecting unit 11. When the venue 10 is a movie theater, the audience terminal 12 receives information which introduces merchandise such as a pamphlet and a poster related to a movie until the start of the screening of the movie, and the received information is displayed on the display 12d (S403).

While the screen which introduces merchandise is being displayed, the audience member can purchase displayed merchandise by operating the input keys 12e. When information indicating that the audience member wants to purchase merchandise is input by operating the input keys 12e (S404), the control unit 12b performs processing to transmit personal information such as the name and address of the purchaser, which is read from the IC card using the reader/writer 12c, and purchase information including the name of the purchased merchandise is transmitted to the information collecting unit 11 (S405). The information collecting unit 11 in turn sends password input screen information for making a payment, and the password input screen is thus displayed on the display 12d. The password is used to make a payment using an electronic money function of the IC card. The password used here may differ from that used when authenticating the IC card at the time the IC card was inserted. The audience member inputs a password, and the input password is sent to the information collecting unit 11. The information collecting unit 11 performs authentication. If the input password does not match the registered password (S406), the purchase of the merchandise is cancelled, and the process returns to the merchandise introduction screen. If the input password matches the registered password (S406), the audience terminal 12 receives information indicating that the authentication was successful from the information collecting unit 11. The reader/writer 12c deducts the cost of the purchased merchandise from the amount of money stored in the IC card, thereby making a payment (S407). If it is confirmed based on communication with the information collecting unit 11 that the money has been successfully deducted, the merchandise purchasing process is terminated. Then, the audience terminal 12 starts receiving merchandise information, and the related merchandise is continuously introduced in a similar manner until the start of the screening of the movie (S403 to S408).

When the movie is about to begin (S408), commercials showing other movies and merchandise are screened prior to showing of a feature film. At the same time, the information collecting unit 11 sends information about movies and merchandise shown in the commercials. The audience terminal 12 receives the transmitted information and displays the information on the display 12d (S409). If the audience member finds the content of the information interesting, the audience member can request more information by operating the input keys 12e. When information indicating that the inquiry for information was made is input using the input keys 12e (S410), the reader/writer 12c reads personal information such as the name, address, or e-mail address and sends the read information as inquiry information to the information collecting unit 11 (S411). While commercials are being shown, the audience terminal 12 receives information concerning the content of the commercials, and the received information is displayed (S409 to S412).

When showing of the feature film begins (S412), the audience terminal 12 receives information about the content of the movie from the information collecting unit 11 in association with the progress of the movie, and the received information is displayed on the display 12d (S413). The information includes the name of the actors in the current scene, the setting, the name of the song being played, and the like. When the relationships among characters appearing on the movie are complicated, information such as a diagram showing the relationships among characters is also displayed in order to assist the audience member in understanding the movie. While the information about the content of the movie is being displayed, the audience member can store information displayed at a memorable scene by operating the input keys 12e. After the movie ends, the stored information can be displayed again. When storing of information about the content of the movie is designated using the input keys 12e (S414), the control unit 12b causes the storage unit 12f to store the received information (S415). After the information is stored, the audience terminal 12 continues receiving information about the content of the movie until the movie ends (S413 to S416).

When screening of the movie is completed (S416), and when information is stored in the storage unit 12f during the movie (S417), the information is read from the storage unit 12f and is displayed on the display 12d (S418). If no information is stored or if displaying of the information is completed, the information collecting unit 11 sends questionnaire information concerning the movie. The audience terminal 12 receives the questionnaire information (S419), and the display 12d displays a screen asking the audience member whether the audience member would like to answer the questionnaire. If the audience member indicates that the audience member is willing to respond to the questionnaire by operating the input keys 12e (S420), questions are displayed on the display 12d (S421). Response information is input using the input keys 12e (S422). When all the responses are input, the reader/writer 12c reads personal information such as the age and occupation of the audience member which is stored in the IC card. The personal information and the response information are transmitted to the information collecting unit 11 (S423). Alternatively, the content of the transmitted personal information can be displayed when the audience member answers the questionnaire. Also, the content of the personal information can be designated by the audience member. When the questionnaire is completed, or when the audience member indicates that the audience member does not want to answer the questionnaire (S420), the IC card is ejected from the card insertion slot 12g (S424). The audience member exits from the venue 10 with the IC card.

In this manner, provision of the audience terminal 12 at each seat enables an information provider to directly provide each audience with more information compared with the conventional technology, thereby significantly increasing the information transmission efficiency. Since it becomes easy for the audience to input information with the assistance of the audience terminal 12, the recovery rate of questionnaires is increased. The information collector can thus collect more information. Also, the audience can receive more information. With the IC card, personal information can be automatically input, or a payment can be automatically made. It thus becomes possible for the audience to easily request more information concerning interesting information or to readily purchase merchandise.

Figure 5:
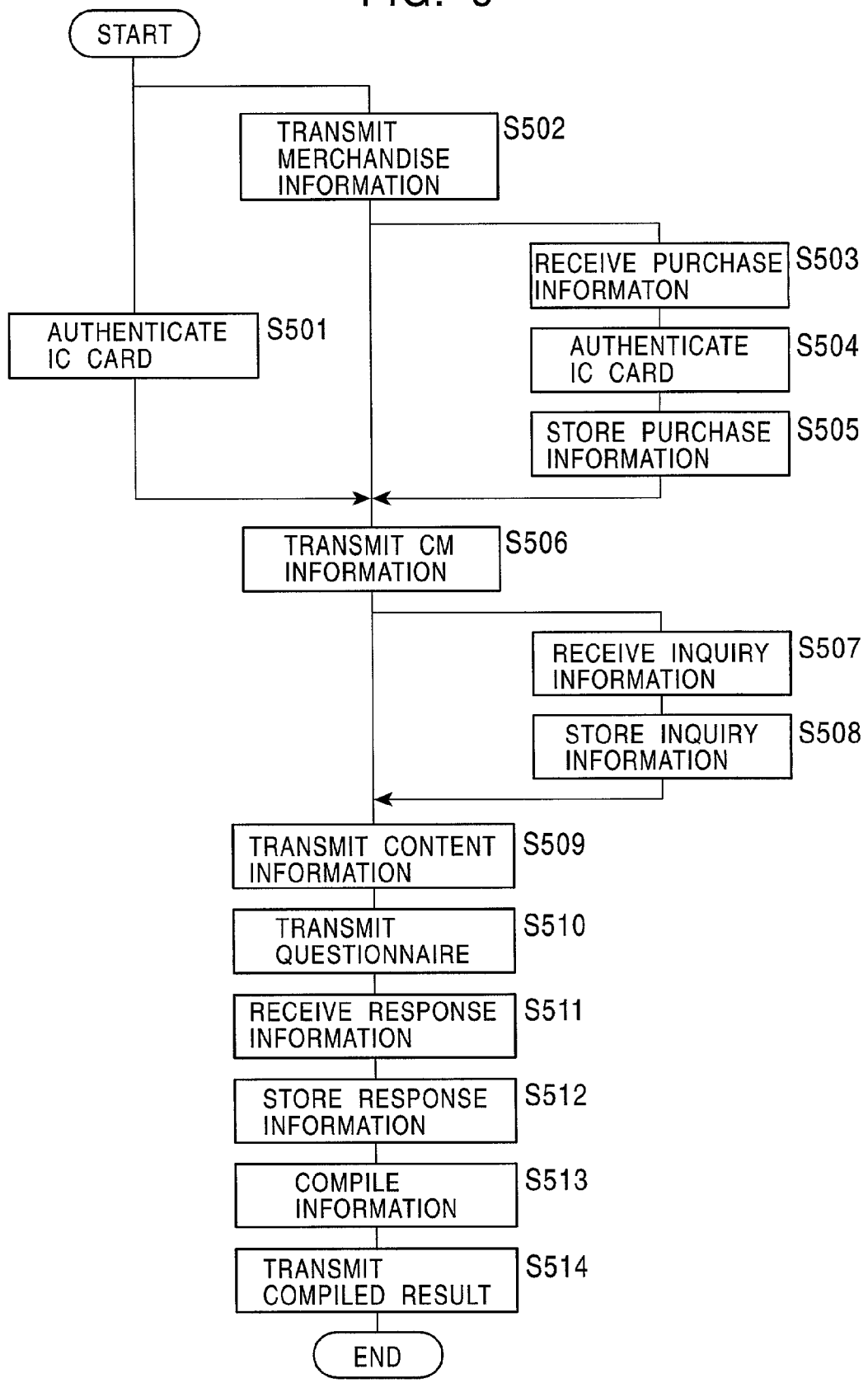
FIG. 5 is a flowchart showing a process performed by an information collecting unit in a movie theater.

FIG. 5 is a flowchart showing a process performed by the information collecting unit 11 in the movie theater.

When members of the audience start entering the venue 10, each audience member inserts their IC cards into the audience terminal 12 installed at each seat. The audience terminal 12 communicates with the information collecting unit 11 through the LAN 15a and authenticates the IC card and the audience member (S501). Information indicating that the IC card was inserted into the audience terminal 12 is transmitted through the LAN 15a. The information collecting unit 11 receives the information using the interface 11a. The control unit 11b reads password input screen information from the storage unit 11c and transmits the information to the audience terminal 12. The password input screen is displayed by the audience terminal 12, and a password is input. The input password and an identification number unique to the IC card number are sent, and the information collecting unit 11 receives the password and the identification number. The control unit 11b performs processing to read a registered password which corresponds to the received identification number and to compare the input password against the registered password. The authentication result information is transmitted through the LAN 15a. Authentication is performed every time an audience member enters the venue 10 and sits in a seat until the end of the showing of the movie.

The audience member is provided with information, and the information collecting unit 11 receives response information (S502 to S505) concurrently with authentication of the IC card. Information about merchandise related to the movie is directly input to the information collecting unit 11 by an input unit (not shown). Alternatively, such information is stored beforehand in the storage unit 11c from an information provider's server connected to the external public telephone circuit 70a. When members of the audience start entering the venue 10, merchandise information is sequentially read from the storage unit 11c, and the merchandise information is transmitted to the audience terminals 12 to 14 from the interface 11a through the LAN 15a (S502).

During transmission, when a purchase request for merchandise is input using the audience terminal 12, the information collecting unit 11 receives purchase information including the name of the requested merchandise and personal information such as the name and address of a purchaser (S503). In order to authenticate the IC card (S504), the information collecting unit 11 reads password input screen information from the storage unit 11c and transmits the information to the audience terminal 12. In a manner similar to that in authenticating the IC card when the IC card is inserted, the password input screen is displayed by the audience terminal 12. A password is input, and the password and an identification number unique to the IC card number are transmitted. The information collecting unit 11 receives the input password and the identification number. The control unit 11b performs processing to read a registered password which corresponds to the received identification number and to compare the input password against the registered password. The authentication result information is transmitted through the LAN 15a. If the IC card is authenticated, the audience terminal 12 deducts a predetermined amount of money from the currency value stored in the IC card. When the information collecting unit 11 determines that the payment has been correctly completed, the information collecting unit 11 stores the purchase information in the storage unit 11c (S505). A similar purchasing procedure is repeated until the start of the screening of the film.

When it becomes time to start screening the film, commercials are displayed on the screen. The information collecting unit 11 sequentially reads information about movies or merchandise shown in the commercials from the storage unit 11c in accordance with the progress of images on the screen, and the information collecting unit 11 transmits the information to the audience terminals 12 to 14 (S506).

During transmission, when an inquiry for more information concerning the transmission content is input using the audience terminal 12, inquiry information including the content of the inquiry and personal information such as the name, address, and e-mail address of the inquirer is transmitted. The information collecting unit 11 receives the inquiry information (S507) and stores the information in the storage unit 11c (S508). When screening of the feature film begins, the information collecting unit 11 sequentially reads information about actors in the movie and descriptions of the content from the storage unit 11c and transmits the read information to the audience terminals 12 to 14 in accordance with the progress of the movie (S509).

When the movie ends, the information collecting unit 11 reads questionnaire information concerning the content of the movie and transmits the questionnaire information to the audience terminals 12 to 14. When the information collecting unit 11 receives response information which includes the input responses (S511), the information collecting unit 11 stores the response information in the storage unit 11c (S512). When members of the audience exit from the venue 10, and when reception of the response information is completed, the merchandise purchase information, the inquiry information, and the questionnaire response information stored in the storage unit 11c are compiled (S513). Concerning the merchandise purchase information and the inquiry information, the number of items, purchaser, and personal information of the purchaser are compiled for each merchandise. Concerning the response information to questionnaires, the responses are compiled by age or occupation. The compiled results are transmitted to servers operated by a merchandise distributor and a client who has requested a company to distribute questionnaires through the public telephone circuit 70a (S514).

For example, the compiled results of the merchandise purchase information are transmitted to a merchandise distributor. Based on the compiled results, the distributor can send predetermined merchandise by mail to an audience member who has requested to purchase the merchandise. At the same time, the distributor can find out sales situations at each venue. A movie distributor or the like can receive inquiry information and response information to questionnaires transmitted from movie theaters in various locations. The movie distributor sends the requested information or predetermined information by mail or by email to an audience member who has requested the information. The response information to questionnaires is further compiled by a server operated by the movie distributor, and hence the response information can be used as reference materials.

With the audience information collecting system, motion picture companies, theatrical performance producers, and information collectors can efficiently collect more information compared with the conventional technology. Merchandise distributors can handle orders and payments without using salesclerks, thus increasing the sales productivity. Also, members of the audience can receive merchandise that the members of the audience want to purchase by mail or can receive necessary information by email. Thus, the members of the audience are freed from the burden of bringing the purchased merchandise home, which is convenient for the members of the audience.

What is claimed is:

1. An audience information collecting system for providing information to an audience member at a movie theater where a movie is presented and for collecting information from the audience member, comprising:

an audience terminal installed at each seat in the movie theater comprising:
provided information output means for outputting provided information to the audience member;
response information input means for inputting predetermined response information given by the audience member in response to the provided information;
personal information reading means for reading personal information from a storage medium having stored therein beforehand the personal information of the audience member; and
first transmitting and receiving means for receiving the provided information and for transmitting the response information and the personal information; and an information collecting unit comprising:
provided information storage means for storing the provided information;
second transmitting and receiving means for transmitting the provided information and for receiving the response information and the personal information; and
compiling means for creating a compiled result of the response information and the personal information;
wherein said terminal is mounted to a seat in which said audience member sits such that said audience member can alternately view said terminal and said movie by merely shifting his or her eyes and without having to reposition said terminal.

2. An audience information collecting system according to claim 1, wherein the compiled result of the response information and the personal information compiled by said information collecting unit is transmitted via a network to a server of a client who has requested that information be collected.

3. An audience information collecting system according to claim 1, wherein the provided information includes advertisement information for merchandise; and the audience member makes a purchase request to purchase the merchandise using said response information input means.

4. An audience information collecting system according to claim 3, wherein funds are electronically stored in said storage medium; and the audience member makes a payment for a purchase requested by the payment request using said personal information reading means.

5. An audience information collecting system according to claim 3, wherein said information collecting unit receives and compiles the purchase request from the audience member and transmits the compiled result to a server of a distributor of the merchandise.

6. An audience information collecting system according to claim 1, wherein information about the content of the movie is sequentially transmitted as the provided information and said information collecting unit while the movie is being presented at the movie theater, and the information about the content of the movie is output from said provided information output means.

7. An audience information collecting system according to claim 1, wherein said audience terminal further comprises storage means for temporarily storing the received provided information.

8. An audience information collecting method for providing information to an audience member at a movie theater where a movie is presented and for collecting information from the audience member, comprising the steps of:
transmitting provided information to the audience member from an information collecting unit installed in the movie theater;
reading personal information from a storage medium having stored therein beforehand the personal information of the audience member, wherein said reading is done using an audience terminal which is installed at each seat in the movie theater and which is connected to said information collecting unit via a network;
receiving and outputting the provided information, wherein said receiving and outputting is done by said audience terminal;
inputting predetermined response information given by the audience member in response to the provided information, wherein said inputting is done by said audience terminal;
transmitting the response information and the personal information, wherein said transmitting is done by said audience terminal; and
receiving and compiling the response information and the personal information, wherein said receiving and compiling is performed by said information collecting unit;
wherein said terminal is mounted to a seat in which said audience member sits such that said audience member can alternately view said terminal and said movie by merely shifting his or her eyes and without having to reposition said terminal.

9. An information providing method for providing information to an audience member at a movie theater, comprising the steps of:
displaying information about related merchandise on an audience terminal at the same time a corresponding image is projected onto a screen at the movie theater in association with showing the image;
receiving a response from the audience member as a function of the displaying step;
initiating a sale of the merchandise to the audience member in response to operation of the audience terminal by the audience member;
wherein said terminal is mounted to a seat in which said audience member sits such that said audience member can alternately view said terminal and a performance by merely shifting his or her eyes and without having to reposition said terminal.

10. An information providing method for providing information to an audience member at a movie theater, comprising the steps of:
showing images on a screen at the movie theater; and
displaying, on a terminal provided at each seat in the movie theater for the audience member, electronic information about the screened images at the same time a corresponding one of the images is being shown;
wherein said terminal is mounted to a seat in which said audience member sits such that said audience member can alternately view said terminal and a performance by merely shifting his or her eyes and without having to reposition said terminal.

11. An information providing method for providing information to an audience member at a movie theater, comprising the steps of:
showing image scenes on a screen at the movie theater;
displaying, on a terminal provided at each seat in the movie theater for the audience member, electronic information about the screened image scenes at the same time the corresponding image scene is being shown;
receiving, when the audience member inputs information using the terminal which displays the information about the image scenes, the information input by the audience member from the terminal; and processing a request by the audience member in response to the input information;

wherein said terminal is mounted to a seat in which said audience member sits such that said audience member can alternately view said terminal and a performance by merely shifting his or her eyes and without having to reposition said terminal.

12. An information providing method for providing information to an audience member at a movie theater, comprising the steps of:

showing image scenes on a screen at the movie theater;

displaying, on a terminal provided at each seat in the movie theater for the audience member, information about the screened image scenes at the same time the corresponding image scene is being shown;

receiving user input information inputted by the audience member from the terminal as a function of the displaying step; and compiling the input information to create response data about the image scenes in response to the inputting operation;

wherein said terminal is mounted to a seat in which said audience member sits such that said audience member can alternately view said terminal and a performance by merely shifting his or her eyes and without having to reposition said terminal.

13. An information providing method for providing information to an audience member at a movie theater, comprising the steps of:

showing image scenes on a screen at the movie theater;

displaying, on a terminal provided at each seat in the movie theater for the audience member, information about the screened image scenes at the same time the corresponding image scene is being shown;

receiving audience unique information for identifying the audience member;

receiving user input information inputted by the audience member from the terminal as a function of the displaying step; and compiling the input information to create response data about the image scenes in association with the audience unique information;

wherein said terminal is mounted to a seat in which said audience member sits such that said audience member can alternately view said terminal and a performance by merely shifting his or her eyes and without having to reposition said terminal.

* * * * *